(12) United States Patent
Cheng

(10) Patent No.: US 6,792,878 B2
(45) Date of Patent: Sep. 21, 2004

(54) WORK TABLE WITH A SAWDUST COLLECTING MECHANISM

(76) Inventor: Meng-Chieh Cheng, No. 169, Chung-Shan Road, Fengyuan City, Taichung Hsien (TW)

(*) Notice: Subject to any disclaimer, the term of this patent is extended or adjusted under 35 U.S.C. 154(b) by 196 days.

(21) Appl. No.: 10/241,141

(22) Filed: Sep. 10, 2002

(65) Prior Publication Data

US 2003/0217674 A1 Nov. 27, 2003

(30) Foreign Application Priority Data

May 21, 2002 (TW) ...................................... 91207285 U

(51) Int. Cl.$^7$ ............................................ A47B 37/00
(52) U.S. Cl. ................................................ 108/50.13
(58) Field of Search .............................. 108/50.13, 24, 108/161; 312/229, 236, 31; 83/451, 56; 454/56, 49; 269/13, 21

(56) References Cited

U.S. PATENT DOCUMENTS

| | | | | | |
|---|---|---|---|---|---|
| 2,341,628 A | * | 2/1944 | Koweindl | ..................... | 454/49 |
| 2,709,954 A | * | 6/1955 | Baker | ..................... | 108/50.13 |
| 3,222,051 A | * | 12/1965 | Bevilacqua et al. | .......... | 269/21 |
| 3,442,230 A | * | 5/1969 | Polen | ..................... | 108/50.13 |
| 4,005,653 A | * | 2/1977 | Arkell | ..................... | 101/389.1 |
| 4,324,487 A | * | 4/1982 | Nishihama | ..................... | 355/73 |
| 5,487,536 A | * | 1/1996 | McEachin | ..................... | 269/21 |
| 6,694,892 B2 | * | 2/2004 | Lin et al. | ................. | 108/50.13 |
| 6,698,360 B2 | * | 3/2004 | Park | ........................ | 108/50.13 |

FOREIGN PATENT DOCUMENTS

| | | | | | |
|---|---|---|---|---|---|
| GB | 2109716 | * | 6/1983 | ................... | 269/21 |
| GB | 2120141 | * | 11/1983 | ................... | 269/21 |

* cited by examiner

Primary Examiner—José V. Chen
(74) Attorney, Agent, or Firm—Townsend and Townsend and Crew LLP

(57) ABSTRACT

A work table includes a box defining a receiving chamber, several partitions disposed in the receiving chamber to form several distributor-receiving chambers, and a side chamber extending frontwardly from a front wall of the box and in fluid communication with the distributor-receiving chambers via outlet holes in the front wall. A distributor member is disposed in each of the distributor-receiving chambers, has an apex and inclined left and right guide plates that cooperate with the bottom plate to form a lower chamber which is in fluid communication with the side chamber via a respective outlet hole, and that cooperate with an adjacent pair of the partitions to form an upper chamber above the lower chamber. Each of the guide plates is formed with a plurality of entrance holes in fluid communication with the upper and lower chambers.

2 Claims, 4 Drawing Sheets

WORK TABLE WITH A SAWDUST COLLECTING MECHANISM

CROSS REFERENCE OF RELATED APPLICATION

This application claims priority of Taiwan Application No. 091207285, filed on May 21, 2002.

BACKGROUND OF THE INVENTION

1. Field of the Invention

The present invention relates to a work table, more particularly to a work table with a sawdust collecting mechanism.

2. Description of the Related Art

Referring to FIG. 1, a conventional work table is shown to include a stand 1, a workpiece-supporting box 2, a working panel 3, and a suctioning device 4.

As illustrated, the box 2 includes a bottom plate 201 that is disposed on the stand 1 and that has a peripheral edge, and a peripheral wall 202 that extends uprightly from the peripheral edge of the bottom plate 201 to define a receiving chamber 203. The bottom plate 201 is formed with an outlet port 204.

The working panel 3 is disposed on the peripheral wall 202 to cover the receiving chamber 203, and is formed with a plurality of equidistantly spaced apart apertures 303 that are in fluid communication with the receiving chamber 203.

The suctioning device 4 includes an air conduit 403, a blower unit 401, and a sawdust container 407. The air conduit 403 has a first end connected to the outlet port 204 of the box 2, and a second end connected to an inlet of the blower 401. The sawdust container 407 is connected to an outlet of the blower 401 via a piping in such a manner that when the blower 401 is actuated, the sawdust, resulting from an abrasive operation performed on the working panel 3 is collected in the sawdust container 407 via the apertures 303 in the working panel 3, and the outlet port 204 in the bottom plate 201. Preferably, an air-filtering bag 406 is mounted on a top end of the sawdust container 407 via a fastener belt 405 to enhance collection of the sawdust in the sawdust container 407.

One disadvantage of the aforementioned conventional work table resides in that since there is no sawdust guiding means provided in the receiving chamber 203 for guiding the sawdust toward the outlet port 204, the sawdust tends to accumulate at corners of the box 2.

SUMMARY OF THE INVENTION

Therefore, the object of this invention is to provide a work table provided with a sawdust collecting mechanism so as to eliminate the aforesaid disadvantage.

Accordingly, a work table of the present invention includes: a stand; a workpiece-supporting box including a bottom plate disposed on the stand and having a peripheral edge, and a peripheral wall extending upwardly from the peripheral edge of the bottom plate to define a receiving chamber, the peripheral wall including a front wall that confines a front side of the receiving chamber and that is formed with a plurality of outlet holes, and a rear wall that is opposite to the front wall and that confines a rear side of the receiving chamber; an auxiliary casing extending frontwardly from the front wall to confine a side chamber that is in fluid communication with the receiving chamber via the outlet holes in the front wall, the auxiliary casing having a bottom that confines a bottom side of the side chamber and that is formed with an outlet port; a plurality of chamber-forming partitions disposed uprightly on the bottom plate in the receiving chamber and connected to the front and rear walls so as to divide the receiving chamber into a plurality of distributor-receiving chambers, each of which is in fluid communication with the side chamber via a respective one of the outlet holes in the front wall; a sawdust collecting mechanism including a plurality of distributor members of inverted V-shaped cross section disposed in the distributor-receiving chambers, respectively, each of the distributor members having an apex vertically spaced apart from the bottom plate, and left and right guide plates extending downwardly and inclinedly from the apex to the bottom plate, each of the distributor members cooperating with the bottom plate to form a lower chamber which is in fluid communication with the side chamber via the respective one of the outlet holes, and cooperating with an adjacent pair of the chamber-forming partitions to form an upper chamber above the lower chamber, each of the left and right guide plates being formed with a plurality of spaced apart entrance holes in fluid communication with the upper and lower chambers, the sawdust collecting mechanism further including a working panel disposed on the peripheral wall, covering the upper chambers, and formed with a plurality of spaced apart apertures that are in fluid communication with the upper chambers; and a suctioning device including an air conduit connected to the outlet port in the side chamber, and a sawdust container connected to the air conduit so as to collect sawdust in the sawdust container via the apertures in the working panel, the upper and lower chambers, the outlet holes in the front wall, and the outlet port in the side chamber upon actuation of the suctioning device.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
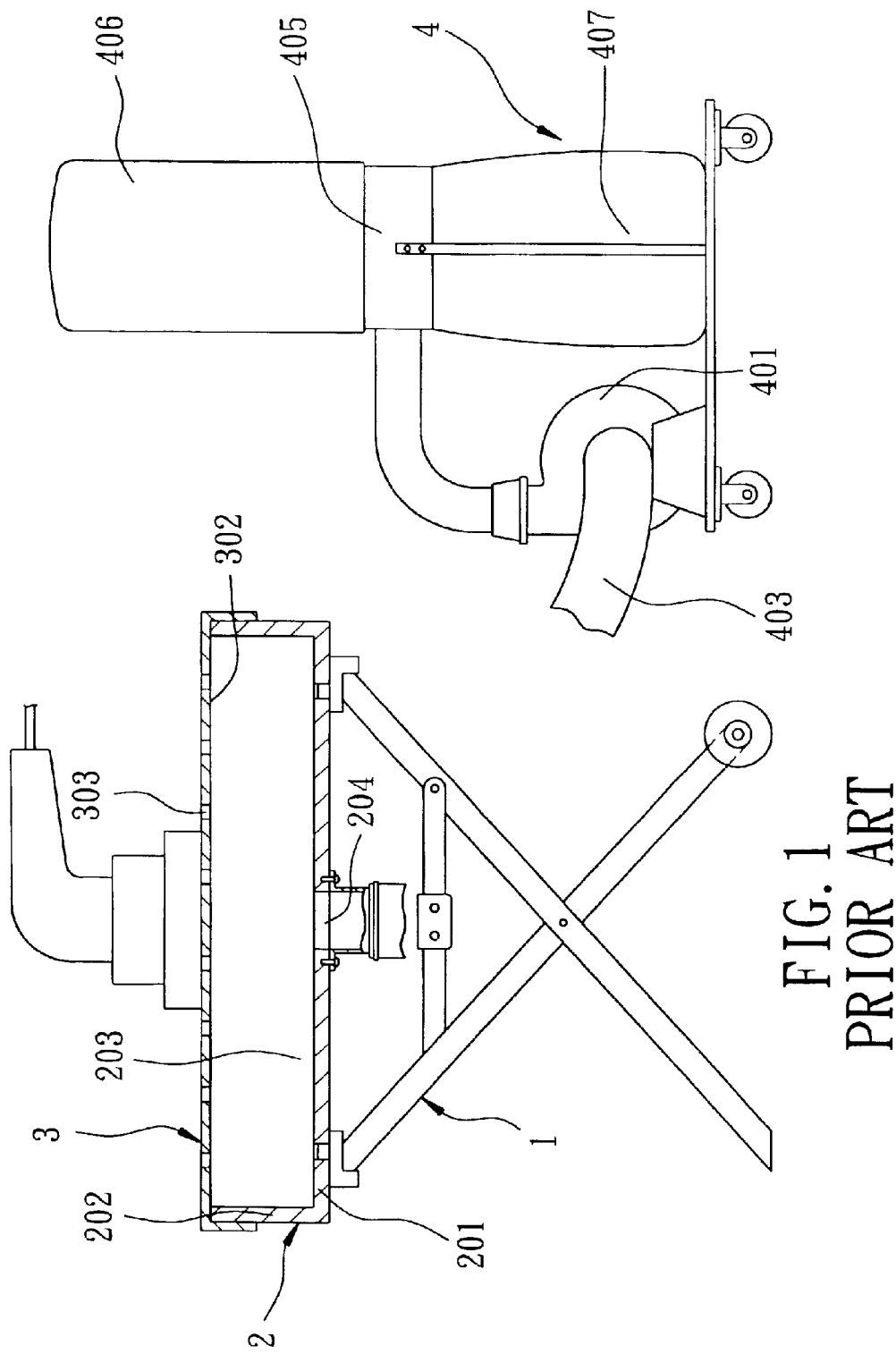
FIG. 1 is a schematic view of a conventional work table.
Figure 2:
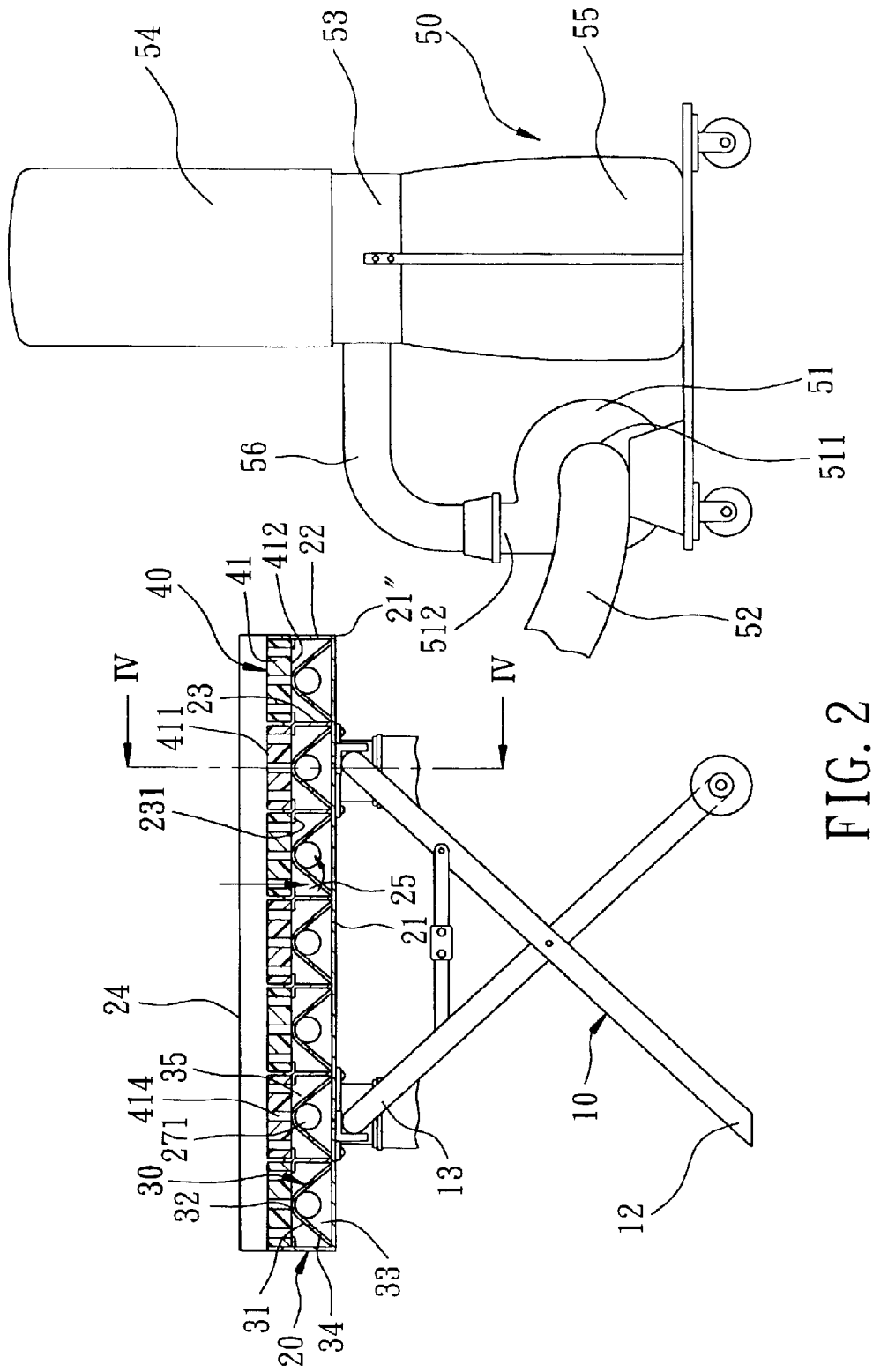
FIG. 2 is a schematic view of a preferred embodiment of a work table according to the present invention.
Figure 3:
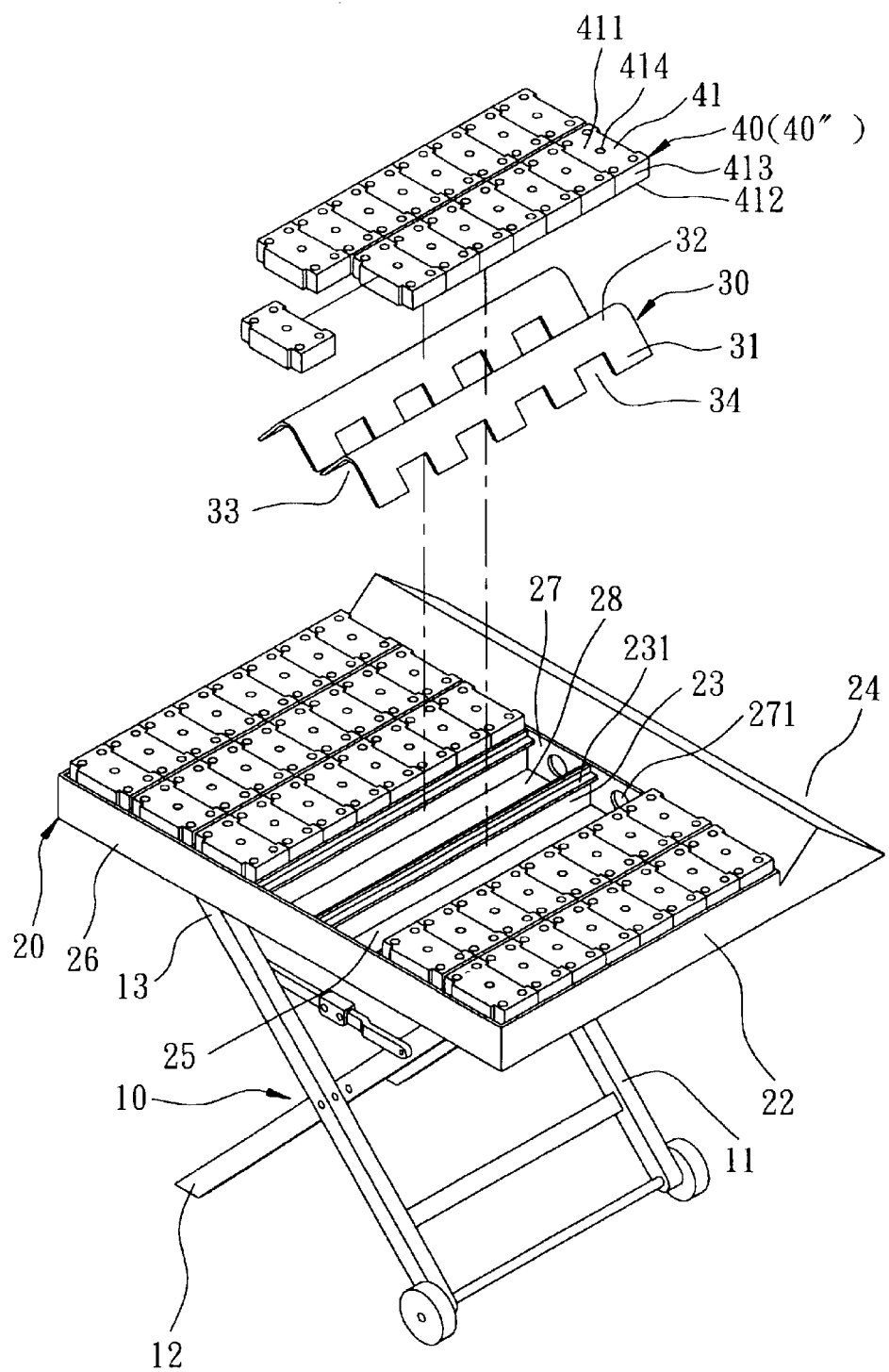
FIG. 3 is a partly exploded view of the preferred embodiment, illustrating how a sawdust collecting mechanism is mounted in a workpiece-supporting box of the preferred embodiment.
Figure 4:
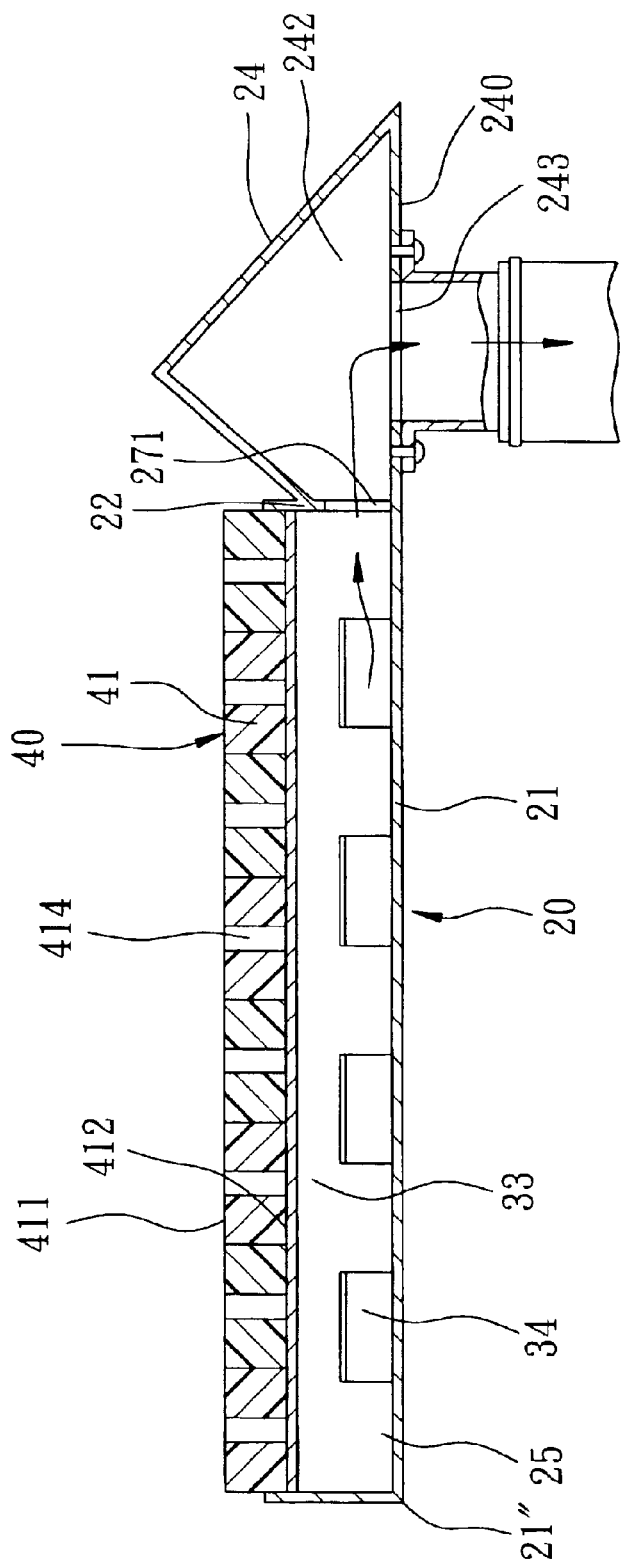
FIG. 4 is a cross sectional view of the preferred embodiment taken along line IV—IV of FIG. 2.

Referring to FIGS. 2 to 4, the preferred embodiment of a work table according to the present invention is shown to include a scissors-like stand 10, a rectangular workpiece-supporting box 20, an auxiliary casing 24, a plurality of chamber-forming partitions 23, a sawdust collecting mechanism, and a suctioning device 50.

As illustrated, the stand 10 includes a pair of pivotally connected legs 11, and has a lower end 12 adapted to be disposed on a ground surface, and a top end 13.

The workpiece-supporting box 20 includes a bottom plate 21 disposed on the top end 13 of the stand 10 and having a peripheral edge 21", and a peripheral wall 22 that extends upwardly from the peripheral edge 21" of the bottom plate 21 to define a receiving chamber 28. The peripheral wall 22 includes a front wall 27 that confines a front side of the receiving chamber 28 and that is formed with a plurality of equidistantly spaced apart outlet holes 271, and a rear wall 26 that is opposite the front wall 27 and that confines a rear side of the receiving chamber 28.

The auxiliary casing 24 extends frontwardly from the front wall 27 to confine a side chamber 242 that is in fluid communication with the receiving chamber 28 via the outlet holes 271 in the front wall 27. The auxiliary casing 24 has a bottom 240 that confines a bottom side of the side chamber 242 and that is formed with an outlet port 243.

The chamber-forming partitions 23 are disposed uprightly on the bottom plate 21 in the receiving chamber 28, and are connected to the front and rear walls 27, 26 so as to divide the receiving chamber 28 into a plurality of distributor-receiving chambers 25, each of which is in fluid communication with the side chamber 242 via a respective one of the outlet holes 271.

The sawdust collecting mechanism includes a plurality of distributor members 30, and a working panel 40. Each of the distributor members 30 has an inverted V-shaped cross-section, and is disposed in a respective one of the distributor-receiving chambers 25. Each of the distributor members 30 has an apex 32 vertically spaced apart from the bottom plate 21, and left and right guide plates 31 that extend downwardly and inclinedly from the apex 32 to the bottom plate 21. Each of the distributor member cooperates with the bottom plate 21 to form a lower chamber 33 which is in fluid communication with the side chamber 242 via the respective one of the outlet holes 271, and cooperates with an adjacent pair of the chamber-forming partitions 23 to form an upper chamber above the lower chamber 33. Each of the left and right guide plates 31 is formed with a plurality of equidistantly spaced apart entrance holes 34 that are in fluid communication with the upper and lower chambers 35, 33.

The working panel 40 is disposed on the peripheral wall 22, and covers the upper chambers 35. The working panel 40 is formed with a plurality of equidistantly spaced apart apertures 414 that are in fluid communication with the upper chambers 35.

The suctioning device 50 includes an air conduit 52, a blower 51, and a sawdust container 55. The air conduit 52 has a first end connected to the outlet port 243 of the side chamber 242, and a second end connected to an inlet 511 of the blower 51. The sawdust container 55 is connected to an outlet 512 of the blower 51 via a piping 56 in such a manner that when the blower 51 is actuated, the sawdust resulting from an abrasive operation performed on the working panel 40 is collected in the sawdust container 55 via the apertures 414 in the working panel 40, the upper and lower chambers 35, 33, the outlet holes 271 in the front wall 27, and the outlet port 243 in the side chamber 242. Preferably, an air-filtering bag 54 is mounted on a top end of the sawdust container 55 via a fastener belt 53 to enhance collection of the sawdust in the sawdust container 55.

In this embodiment, each of the chamber-forming partitions 23 has a top end with two opposite sides, and left and right retention flanges 231 that project outwardly and laterally from the opposite sides of a respective one of the chamber-forming partitions 23 and that extend between the front and rear walls 27, 26. Preferably, the working panel 40 includes a plurality of parallel block sections 40" extending between the front and rear walls 27, 26. Each of the block sections 40" includes a plurality of panel blocks 41 having opposing ends 413 seated on an adjacent pair of the left and right retention flanges 231 of an adjacent pair of the chamber-forming partitions 23 to cover a top side of a respective one of the upper chambers 35. Each of the panel blocks 41 has opposing upper and bottom sides 411, 412. The apertures 414 extend through the upper and bottom sides 411, 412 of a respective one of the panel blocks 41.

With this invention thus explained, it is apparent that numerous modifications and variations can be made without departing from the scope and spirit of this invention. It is therefore intended that the invention be limited only as indicated in the appended claims.

I claim:

1. A work table comprising:

a stand;

a workpiece-supporting box including a bottom plate disposed on said stand and having a peripheral edge, and a peripheral wall extending upwardly from said peripheral edge of said bottom plate to define a receiving chamber, said peripheral wall including a front wall that confines a front side of said receiving chamber and that is formed with a plurality of outlet holes, and a rear wall that is opposite to said front wall and that confines a rear side of said receiving chamber;

an auxiliary casing extending frontwardly from said front wall to confine a side chamber that is in fluid communication with said receiving chamber via said outlet holes in said front wall, said auxiliary casing having a bottom that confines a bottom side of said side chamber and that is formed with an outlet port;

a plurality of chamber-forming partitions disposed uprightly on said bottom plate in said receiving chamber and connected to said front and rear walls so as to divide said receiving chamber into a plurality of distributor-receiving chambers, each of which is in fluid communication with said side chamber via a respective one of said outlet holes;

a sawdust collecting mechanism including a plurality of distributor members of inverted V-shaped cross-section disposed in said distributor-receiving chambers, respectively, each of said distributor members having an apex vertically spaced apart from said bottom plate, and left and right guide plates extending downwardly and inclinedly from said apex to said bottom plate, each of said distributor members cooperating with said bottom plate to form a lower chamber which is in fluid communication with said side chamber via the respective one of said outlet holes, and cooperating with an adjacent pair of said chamber-forming partitions to form an upper chamber above said lower chamber, each of said left and right guide plates being formed with a plurality of spaced apart entrance holes in fluid communication with said upper and lower chambers, and a working panel disposed on said peripheral wall and covering said upper chambers, said working panel being formed with a plurality of spaced apart apertures that are in fluid communication with said upper chambers; and a suctioning device including an air conduit connected to said outlet port of said side chamber, and a sawdust container connected to said air conduit so as to collect sawdust in said sawdust container via said apertures in said working panel, said upper and lower chambers, said outlet holes in said front wall, and said outlet port in said side chamber upon actuation of said suctioning device.

2. The work table as defined in claim 1, wherein each of said chamber-forming partitions has a top end with two opposite sides, and left and right retention flanges projecting outwardly and laterally from said opposite sides of a respective one of said chamber-forming partitions and extending between said front and rear walls, said working panel including a plurality of parallel block sections extending between said front and rear walls, each of said block sections including a plurality of panel blocks having opposing ends seated on an adjacent pair of said left and right retention flanges of an adjacent pair of said chamber-forming partitions to cover a top side of a respective one of said upper chambers, each of said panel blocks having opposing upper and bottom sides, said apertures extending through said upper and bottom sides of a respective one of said panel blocks.

* * * * *